United States Patent [19]

Higbee

[11] 4,258,755

[45] Mar. 31, 1981

[54] HELICAL WIRE REINFORCED HOSE

[75] Inventor: Charles D. Higbee, Buena Park, Calif.

[73] Assignee: Bandag Incorporated, Muscatine, Iowa

[21] Appl. No.: 27,600

[22] Filed: Apr. 5, 1979

[51] Int. Cl.³ .............................................. F16L 11/08
[52] U.S. Cl. .................................... 138/122; 138/126; 138/127; 138/130; 138/133; 138/104; 138/153
[58] Field of Search ............... 138/119, 125, 126, 127, 138/130, 132, 133, 122, 138, 153, 173, 174, 104; 242/42; 156/143, 149

[56] References Cited

U.S. PATENT DOCUMENTS

| 2,386,158 | 10/1945 | Collins | 242/42 |
| 3,502,527 | 3/1970 | Borden | 156/143 |
| 3,534,778 | 10/1970 | Goecke | 138/122 |

FOREIGN PATENT DOCUMENTS

| 541256 | 11/1941 | United Kingdom | 138/104 |
| 1186089 | 4/1970 | United Kingdom | 138/133 |

Primary Examiner—James E. Bryant, III
Attorney, Agent, or Firm—Cushman, Darby & Cushman

[57] ABSTRACT

A flexible reinforced cured resin hose is shown having a combination of helically wound cable wires and body wires embedded therein in layers in the wall forming the hose. Two plies of cable wires are wrapped in opposite directions around the periphery of a liner tube supported on a mandrel, the plies being supported in a resin filler layer applied over the liner to hold the wires spaced apart to prevent the wires from rubbing as the hose is flexed. The body wires are more widely spaced apart and are spaced from and wrapped over the layers of cable wires to be embedded in the resin filler layer. A breaker layer may be wrapped over the assembly, an outer layer of wear resistant neoprene is applied and then a nylon cure tape is applied over the entire assembly prior to curing. A nylon rope is also spiraled down the outside of the assembly to be positioned exactly midway between the spaced apart body wires and then the resin is cured under heat and pressure. The nylon cloth shrinks to force the resin and wire components into a solid mass and the nylon rope shrinks even more to produce a spiral groove around the periphery of the finished hose product that has a tought flat surface extending throughout the flat surface outside the groove.

4 Claims, 4 Drawing Figures

HELICAL WIRE REINFORCED HOSE

BACKGROUND

It is old to provide spirally wound wire layers in the walls of tubes formed of cured resins as represented by the patents to Meissner, U.S. Pat. No. 2,609,002, Sept. 2, 1952 and to Champleboux et al, U.S. Pat. No. 3,766,949, Oct. 23, 1973.

The Meissner patent shows rather widely spaced spring support wire in a thin walled hose stucture that deforms when the hose is bent so that a portion of the peripheral wall of the hose flexes inwardly in the form of a bead while the outer wall is stretched taut. The wire spring coils are deformed so that on the periphery of the casing around the inner radius of the bent pipe, the wires move more closely together and the wires move apart somewhat as the casing stretches around the outer periphery of the bend.

The Champleboux et al patent shows a hose designed to withstand substantial external pressures wherein differences in pressure of about 6 or 7 bars between the internal passageway and the external wall of the hose can be sustained in a cylindrical hose without any appreciable crushing of the hose. The structure is not described as being adapted, however, to contain substantial internal pressures, it being stated that it should be used where such pressure is equal to or less than 2 bars. Reenforcing wires or rings are built into the wall of the hose to sustain the pressure applied inwardly against the periphery of the hose. If the hose is to be bent, a special corrugated design is required, having cylindrical zones joined by bellows forming zones that may extend either inwardly or outwardly from the internal and external walls of the hose.

BRIEF DESCRIPTION OF THIS INVENTION

The hose structure shown here makes use of an inert inner liner onto which several layers of wire supporting means are disposed in a cooperative relationship. The liner is reenforced internally with plies formed of spirally wound cable wires. These wires are precision wrapped around the periphery of the liner at a substantial angle with respect to the longitudinal axis of the hose, the wires in the different plies being wrapped in oppositely directed spirals around the liner. These plies are embedded in a filler resin layer that supports the wires so that the wires do not rub against themselves in the coils forming each spiral and the separate cable wires are held spaced within the rubber filler layer so that they do not rub on each other. Another single layer of parallel disposed body wires is wrapped spirally around the cable wire layers at a somewhat steeper pitch and these wires are placed in the wall of the hose outwardly from the body wires and are spaced much more widely apart from each other. The spacing between the body wires wrapped onto the carcass of the hose is made unequal, however, and then a neoprene cover layer is applied. As the assembly is being cured, in the space between the two more closely spaced body wires, an inwardly pressed groove is formed around the periphery of the hose.

It is therefore an object of this invention to provide a flexible industrial hose adapted to contain fluids being pumped at high pressure.

It is another object to provide a flexible high pressure hose having a negligible internal structural change throughout any area of flexure.

Another object is to provide a flexible hose structure having a substantial strength against endwise compression or elongation.

Another object is to provide a flexible hose structure having a substantial hoop strength to resist bursting.

Another object is to provide a flexible hose structure having a spirally formed groove around its periphery to control the bending action of the hose.

Another object is to provide a flexible hose structure having a spirally formed groove on its outer surface disposed between wide outer bearing surfaces whereby to minimize the effect of abrasive wear on the peripheral surface of the hose.

Another object of the invention is to provide a flexible hose structure that has a maximum wire reenforcement in the zone where kinking tends to start when the hose is bent.

Another object of the invention is to provide a structure that may be marked with a specification or trademark that can be inscribed on the outside of the hose in the grooved areas that are removed from those areas subjected to the most abrasion during normal use.

Other objects will appear from the description below.

IN THE DRAWINGS

DETAILED DESCRIPTION

Figure 1:
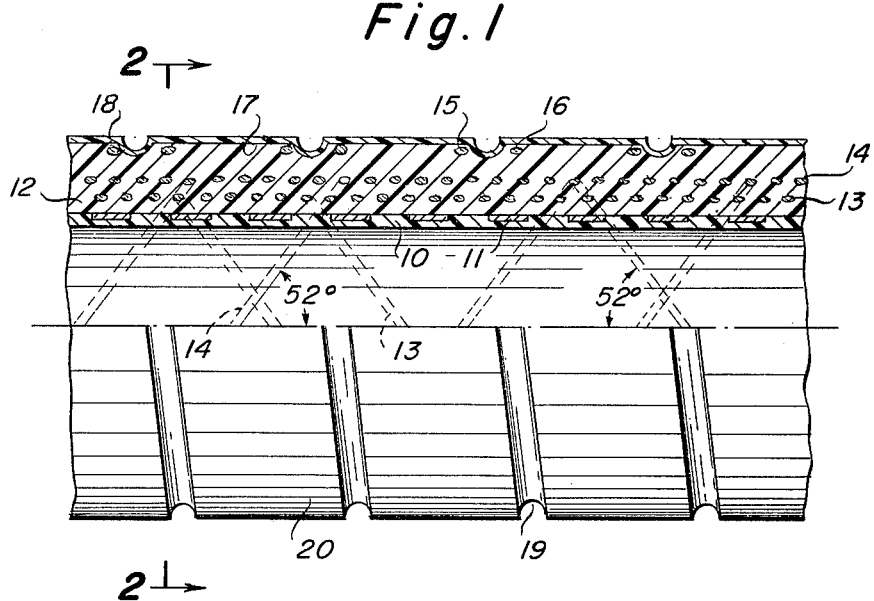
FIG. 1 is a cut-away side elevation of a typical hose structure.
Figure 2:
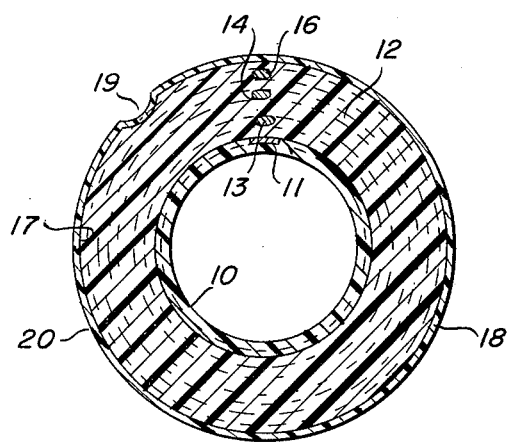
FIG. 2 is a section taken along line 2—2 of FIG. 1.
Figure 3:
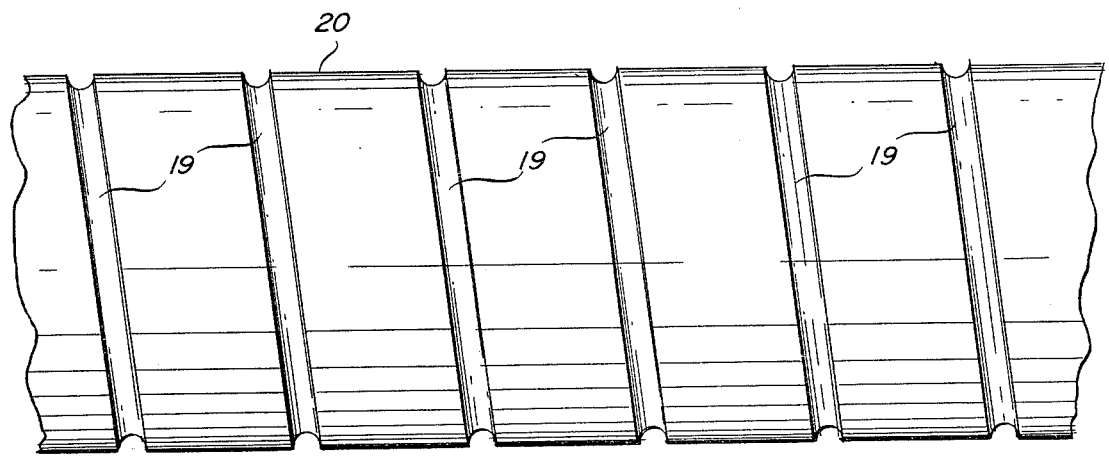
FIG. 3 is a side elevation of the finished hose.

The hose of this invention is preferably formed to have a cylindrical cross section and includes an inner liner 10 made of an oil resistant synthetic resin such as a thin nitrile tube. During assembly of the hose, this tube may be carried on a cylindrical mandrel associated with means under the control of a computerized wire wrapping machine. To begin the assembly operation, a fabric breaker layer 11 is precisely wrapped in a spiral around its periphery.

After the breaker layer is in place, a layer 12 of uncured filler resin is wrapped around the material on the mandrel and a first layer of wire cable 13 is wrapped in a precise computer controlled layer in position close to the outside surface of the inner liner. This cable wire layer is disposed in a spiral at an angle of approximately 52° with respect to the longitudinal axis of the mandrel and the turns of the spiral are spaced apart one from another so that the coils do not rub on each other.

Another layer of resin filler is applied and a second layer of cable wire 14 is precisely applied to the periphery of the material on the mandrel. This second cable wire spiral is laid on at an angle of 52° with respect to the longitudinal axis of the mandrel, this spiral wrapping being laid on in an opposite direction to the first spiral so that the wires of the cable wire layers are crossed. The wires 14 do not, however, rub on wires 13 and the separate coils in the second layer are each held spaced apart by the filler resin that is disposed between and surrounds the wires in these two cable wire coils to hold them properly positioned around the liner and the filler resin holds each of the cable wires spaced apart one from the other.

An additional layer of filler resin is applied over cable wire 14 and then a layer of two parallel disposed body wires 15 and 16 of heavy gauge high tensile strength wire are precisely wrapped spirally onto the assembly. The spiral of these two wires has a lead equal to one-half the internal diameter of the hose with a tolerance of ±1½" and one wire is wrapped onto the assembly at a phase shift around the axis of the mandrel of 140° with respect to the other with a tolerance of ±30° from 140° to cause the separate coils of the two body wires to be unevenly spaced one from another for a purpose that will appear more fully below.

Additional uncured resin filler may be wrapped over the body wires and then a breaker strip 17, that may be a woven cord ply, is wrapped onto a layer of filler resin before an outer layer 18 of neoprene is wrapped onto the assembly forming the body of the hose.

While the completed uncured hose structure is on the mandrel, a nylon cure tape is wrapped onto the assembly and then, for example, when making a 6" diameter hose, a ⅜" diameter nylon rope is wrapped spirally over the cure tape. The rope is wrapped with precision placement under the control of the computerized machine so that the rope is equally spaced from both body wires 15 and 16 and is positioned midway between these wires over the area where they are more closely spaced together. The rope is, of course, laid on in a spiral having the same lead as the spiral used for wrapping the body wires onto the hose body and it is essential that the rope never cross one of the body wires. Computer control insures the ability to match the spiral lead of the wire with the rope and to never cross one of the body wires.

After the nylon curing wrappings have been applied, the mandrel can be delivered to a curing oven where the uncured resin layers can then be subjected to heat and pressure. The nylon shrinks when subjected to heat and the resin layers are consolidated into a solid cured mass and since the rope shrinks to a greater degree than the cloth wrapping, a continuous spiral groove 19 is formed on the periphery of the hose. The surface 20 over the space between the coils of spiral 19 are confined during curing by the nylon cloth wrapping so that a cylindrical surface is produced on the surface of the hose between the more wide spaced body wires.

When curing is complete, the nylon rope and curing strip wrappings are removed and the cured hose element is stripped from the mandrel.

The hose fabricated as above described has cable wire reenforcing layers 13 and 14 that provide for an improved degree of hoop strength to contain high fluid pressures within the hose. The 52° disposition of the opposed spirally wrapped layers allows for a very slight growth in diameter of the hose as the pressure increases to transfer the pressure load from the liner to the cable wires that act as hoops around the hose and ultimately the load is transferred in part to the heavier gauge high tensile strength body wires 15 and 16. The closely spaced cable wires 13 and 14 also provide a substantial endwise support structure for the hose to sustain it in those situations where the hose may be subjected to longitudinal forces. These forces may occur when a section of hose is suspended or hung in such a way as to support its own weight, with perhaps part of or all of other hose sections attached to it.

The body wires 15 and 16 are embedded within the mass forming the wall of the hose. The filler resin layer 12 holds all of the coils of all of the cable and body wires properly spaced so none of the wires can rub against each other either in the coils of the body wires or the coils of the cable wires.

The pitch of the body wire coils that are positioned close to the outer peripheral wall of the hose, permits the hose to be bent without interference from the internal wire reenforcing means. The bending is permitted without altering the reenforcing strength added to the structure by the body wires.

It will be noted that due to the phase shift of 140°±30° mentioned above, that the wires 15 and 16 are unevenly spaced apart and that the groove 19 produced during the curing process, is spaced halfway between the more closely spaced wires. As seen in FIG. 1, the wires and the groove are disposed in an assembled relationship so that the pairs of wires tend to support the edges of the groove and that a wide cylindrical surface is exposed between the more widely spaced wires that surround the coils of the groove.

Figure 4:
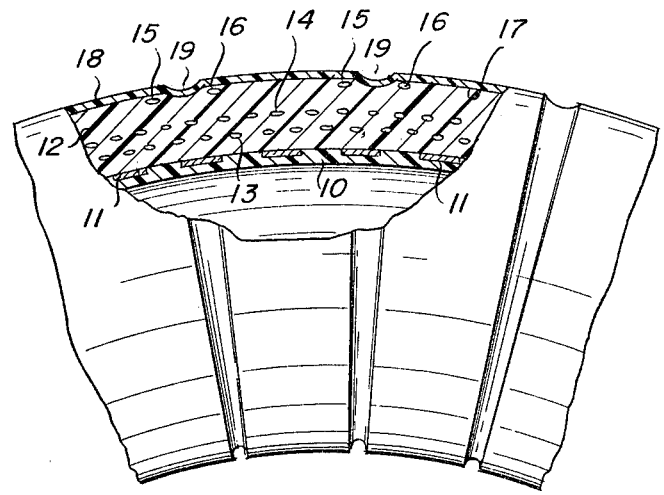
FIG. 4 is a detail cross section showing the bend in the hose.

The production of the groove in the area between the more closely spaced body wires serves to dispose these wires in the most advantageous position to support the hose body when it is bent without interfering with the bending action of the hose. As will be seen upon reference to FIG. 4, when the hose is bent, the outer periphery of the hose elongates at the area of the groove to stretch the groove out and on the inner radius of the bend, the groove is squeezed closed so that the hose can be bent within the specification limits established in the industry for high pressure flexible hose, without substantial deformation of the internal surface of the hose.

It will also be noted that the thicker wall mass of the body of the hose that is situated between the more widely spaced apart body wires 15 and 16, does not deform to any perceptible degree as the hose bends. These elements tend to act like the treads on a tank to support the hose around the bend without being deformed themselves. In any event the bending deformation is substantially confined to the mass of the body defined by the groove where the more closely spaced coils of wires 15 and 16 are positioned to lend added reenforcement to the wall of the hose.

On its outer peripheral surface, the cylindrical bearing surface on the space between the coils of the groove provides a maximum bearing surface for the hose body. Especially at the bends, this bearing surface area is preserved in a relatively cylindrical shape because this thicker portion of the wall does not deform appreciably as the hose is bent, so that no undue abrasive stress is allowed to be imposed on any one area of the length of the hose as against any other area of its length even at bends, when the hose is in use. Abrasion is thus distributed as widely as possible over all of the outer surface of the hose to maximize its life by eliminating localized bulged surfaces in the exposed periphery of the hose where wear could be concentrated to produce worn spots that are typically encountered in known flexible corrugated hoses having rather more steeply pitched spiral outer surfaces.

It is also to be noted that when a corrugated hose is bent, the body tends to bend inwardly at the groove forming the corrugation and tends to bow outwardly between the corrugations. This action in known structures may cause the hose to begin to form a kink that destroys the shape of the hose. The present construction that provides for the positioning of the heavier gauge body wires closely spaced to the shoulders of the groove, reenforces the wall structure of the hose to preclude the inward and outward bending of the corrugation whereby to minimize the tendency of a pipe to kink at the very point where the kinking action starts. The concentration of the stiffening reenforcing in the shoulder area of the groove rigidifies the wall against kinking while also adding to the tensile strength of the wall to counteract bursting pressures from within.

Additional characteristics of this structure are the ability to place identifying indicia within the groove such as a distinctive color stripe and even the placement of a trademark within the groove where the indicia will be preserved from abrasive wear to which it would otherwise be subjected if placed on the exposed peripheral surface of a hose body.

While the above description refers to the preferred structure of this invention, many modifications thereof will occur to those skilled in the art that may fall within the scope of the following claims.

What is claimed is:

1. A flexible hose comprising: an inner tubular liner defining a smooth-surfaced bore; a relatively thick layer of resilient material surrounding the liner and incorporating circumferentially-extending reinforcing material; a pair of parallel spiral body wires embedded in said resilient layer radially outwardly of said reinforcing material and close to the external surface of said resilient layer the wires of said pair being closely spaced from each other and the pitch of said pair being greater than the distance between the wires of said pair so that there is a narrow space between the wires of said pair; a spiral groove formed in the external surface of said resilient layer, said groove lying between the wires of said pair in said narrow space such that the side walls of the groove are adjacent to and supported by the wires of said pair, the pitch of said pair of wires and the positions of the wires of said pair relative to said groove being such that when the hose is bent said pair of wires and said groove cooperate to prevent inward and outward bending of said resilient layer thereby minimizing kinking of the hose and maintaining the bore of the tubular lining smooth.

2. A hose as in claim 1 wherein the pitch of said pair of wires is about one-half the internal diameter of the hose.

3. A hose as in claim 1 or 2 wherein said circumferentially extending reinforcing material includes two plies of wire wrapped spirally around said liner and embedded in said resilient layer, said plies being spaced from each other in the radial direction and being wrapped at opposite angles relative to the axis of the hose whereby said plies are crosswise with respect to one another.

4. A flexible hose comprising: an inner tubular liner; a relatively thick layer of resilient material surrounding the liner and having spirally-wrapped reinforcing strands embedded in said material; a pair of parallel spiral body wires embedded in said resilient material radially outward of said reinforcing strands and close to the external surface of the resilient layer, the wires of said pair being closely spaced from each other and the pitch of said pair being about plus or minus 50% of the internal diameter of the hose and being greater than the distance between the wires of said pair so that there is a narrow space between the wires of said pair; a spiral groove formed in the external surface of said resilient layer, said groove lying between the wires of said pair in said narrow space such that the side walls of the groove are adjacent to and supported by the wires of said pair whereby said wires provide sufficient reinforcement, in the zone where kinking of the hose tends to occur when the hose is bent, to prevent inward or outward kinking of the hose at the location of the bend.

* * * * *